Aug. 18, 1931.   A. CALIMANI ET AL   1,819,226
DEVICE FOR MILK VESSELS
Filed April 20, 1929
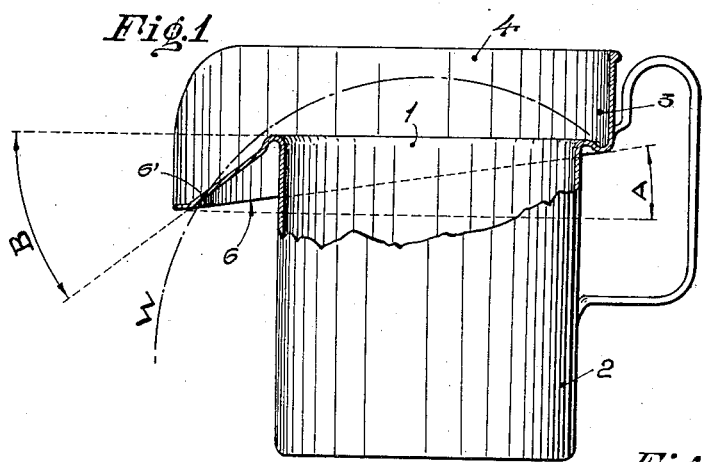
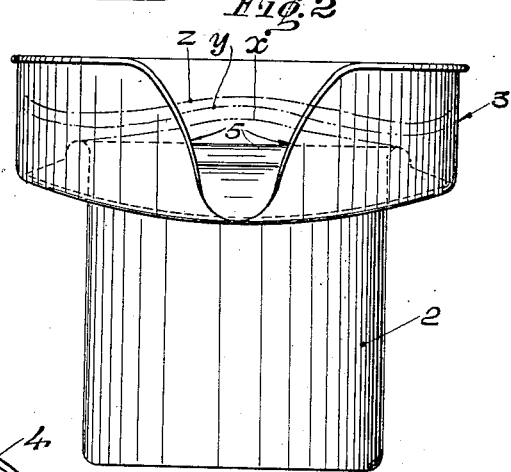
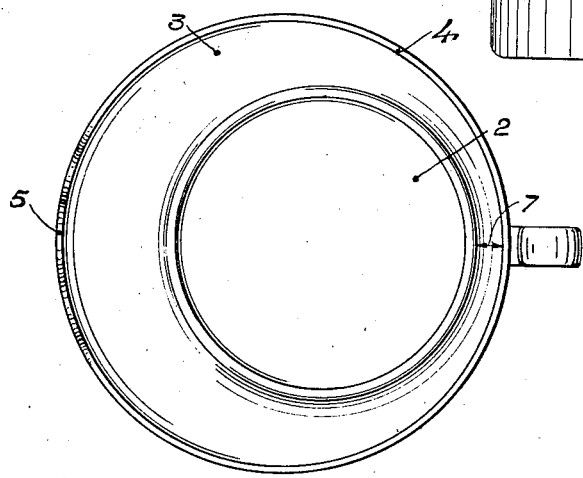
ATTILIO CALIMANI
INVENTOR.
BY *Powers*
ATTORNEY Patented Aug. 18, 1931

1,819,226

UNITED STATES PATENT OFFICE

ATTILIO CALIMANI AND GIUSEPPE CAMPANA, OF MILAN, ITALY, ASSIGNORS OF ONE-HALF TO SAID CALIMANI AND ONE-HALF TO GUILIO MONETA

DEVICE FOR MILK VESSELS

Application filed April 20, 1929, Serial No. 356,864, and in Italy October 18, 1928.

The present invention relates to a device for milk boiling vessels.

Numerous attempts have already been made to solve the problem of preventing milk from running over the vessel edge when the milk boils. The arrangements thus far proposed, however do not attain the object in view.

They may be divided into two classes, namely:

(1) Those comprising hollow spaces of sufficient capacity to contain the milk which, through inattention or oversight, has been suffered to run over;

(2) Those in which means are provided, capable of withholding the milk that runs over from the vessel and to convey it into a further vessel intended to receive it.

The apparatus of the first class exhibit the inconvenience that in case of oversight the milk, after running over from the main vessel into the hollow space intended to receive it, is liable to run over also from the latter.

In the apparatus of the second class the provisions made are inadequate and do not take into sufficient account of capillary attraction, surface tension of liquids and gravity, as these and other forces operate in the pouring or flow of liquids.

It is well known that when milk commences to boil, a thin film forms at its surface and rapidly rises under the pressure of the underlying vapor till it breaks at the edge of the vessel, thus letting the milk flow over in a liquid sheet of parabolic shape. Sufficient means must therefore be opposed to the expansion and to the overflow, the said means having at the same time to serve for condensing the liquid and conveying it to the receiving means.

The apparatus forming the subject matter of the present invention distinguishes itself by the fact that the opening of the vessel is combined with a peripheral collecting rim whose top edge is substantially parallel with the upper edge of the vessel whilst the bottom is suitably inclined so as to let the milk flow to a spout with which the rim is fitted. The outer wall extends appreciably higher up than the top edge of the vessel, so as to serve as a barrier to the milk froth that rises by effect of the ebullition, thus being of assistance in condensing the overflowing milk and in causing it to flow to the vessel.

A further characteristic feature of the apparatus according to the invention is that the rim is eccentrically disposed around the top edge of the vessel in order that the cross-section of the rim increases progressively in width and depth as it approaches the spout, so as to comply with the principle involved in the progressive augmentation and flow of liquids.

Yet a further characteristic feature of the invention consists in the fact that the vessel and the rim are made in a single piece out of a metal plate by stamping.

The accompanying drawings illustrates an embodiment of the invention by way of example only.

Fig. 1 shows the boiling vessel in side elevation, partly in section.

Fig. 2 is an elevation at right angles to Fig. 1.

Fig. 3 is a plan view of the same vessel.

The edge 1 of the boiling vessel 2 according to the invention is provided with a collecting rim 3, whose top edge 4 is substantially parallel with the upper edge 1 of the vessel but extends to a higher level than the latter.

The rim 3 is provided with a large spout 5, and the rim bottom 6 is inclined to the horizontal by an angle A of 12°. At 6°, the spout the angle B made by the bottom with the horizontal is still greater, so as to accelerate the outflow of the milk from the spout 5. As indicated by the dotted lines x, y, z the milk on boiling gradually rises and the characteristic peripheral sheet of liquid overflowing the vessel edge 1 is stopped by the higher wall 4, by which it is obliged to flow along the rim 3 and finally to pour itself through the spout 5 into an underlying vessel. If no rim according to the invention were provided, that is to say, if the outer wall of the rim were not sufficiently high, the milk would overflow according to a curve —w—.

As already stated, a characteristic feature in the manufacture of the apparatus is that the vessel and the arrangement preventing the overflowing of the milk are made from a single plate by stamping, all joints (soldered or otherwise obtained) being avoided. However, it is obvious that the actual embodiment of the invention may start from other manufacturing ideas as far as regards the making of the apparatus in several parts and their subsequent assemblage, as well as far as regards the materials employed, since the vessel might be made of aluminum, porcelain or other material.

Figure 3 of the drawings shows the characteristic eccentricity between the vessel proper (2) and the collecting rim (3), this eccentricity allowing of the progressive increase in the cross section of the collecting rim from the point 7 diametrally opposite to the spout 5 on both half-peripheries.

We claim:

1. A milk boiling vessel, including the combination, with a vessel proper having an upper edge, of a collecting rim surrounding said upper edge provided with a spout and with a top edge which is substantially parallel with the upper edge of said vessel proper, which collecting rim is eccentrically disposed with respect to said vessel proper in order to provide a progressive increase of the cross section of said collecting rim in width and depth toward said spout, while the bottom of said collecting rim forms a gutter which inclines downwardly below the upper edge of said vessel proper toward said spout, and the bottom of said spout extending from the upper edge of said vessel proper to the lowest point of the bottom of said collecting rim.

2. A milk boiling vessel including the combination, with a vessel proper having an upper edge, of an integral and inclined collecting rim surrounding said upper edge provided with a spout and with a top edge substantially parallel with the upper edge of said vessel proper and disposed at a higher level than the same, which collecting rim forms a gutter eccentrically disposed with respect to said vessel proper and progressively increased in cross section and transverse downward inclination toward said spout below said upper edge of said vessel proper, while said spout is arranged at the point of greatest cross section of said collecting rim in a position diametrically opposite the point of highest elevation and minimum cross section thereof, the bottom of said spout extending from the upper edge of said vessel proper to the lowest point of the bottom of said collecting rim.

ATTILIO CALIMANI.
GIUSEPPE CAMPANA.